Dec. 18, 1962 A. H. BOBECK 3,069,665

MAGNETIC MEMORY CIRCUITS

Filed Dec. 14, 1959 3 Sheets-Sheet 1

INVENTOR
A. H. BOBECK
BY William H. Kamstra
ATTORNEY

INVENTOR
A. H. BOBECK
BY William H. Kamstra
ATTORNEY

INVENTOR
A. H. BOBECK
BY
William H. Kamstra
ATTORNEY 3,069,665

MAGNETIC MEMORY CIRCUITS

Andrew H. Bobeck, Chatham, N.J., assignor to Bell Telephone Laboratories, Incorporated, New York, N.Y., a corporation of New York Filed Dec. 14, 1959, Ser. No. 859,443
26 Claims. (Cl. 340—174)

This invention relates to information handling systems and more particularly to coordinate magnetic memory arrays adapted for use in such systems.

Coordinate memory arrays in which information is stored in the form of a predetermined pattern of permanent magnets arranged on an information card are well known in the art. Further, such arrays in which magnetic switching elements are employed to interrogate the stored information are also well known. In one such illustrative memory array a particular pattern of permanent magnets is arranged closely adjacent a corresponding coordinate array of magnetic switching elements. The field of each of the permanent magnets is sufficient to magnetically saturate the adjacent corresponding magnetic elements. When an interrogation drive magnetomotive force is now applied to the memory elements having permanent magnets adjacent thereto, the latter memory elements, as a result, will be unable to respond by flux switching. This result may be detected in the conventional manner by the absence of readout signals on sensing conductors coupled to the switching elements. This absence is conventionally held indicative of stored binary "0's" in the pattern of permanent magnets. Where no permanent magnets appear adjacent the magnetic switching elements, the interrogating drive will be effective to cause a flux switching in the adjacent switching elements. As a result, and also in the conventional manner, output signals will be induced in coupled sensing conductors, which signals will be indicative of stored binary "1's".

The pattern of permanent magnets is advantageously affixed to a nonmagnetic card or plate. The points on the plate corresponding to the crosspoints of the associated coordinate array of magnetic elements at which no permanent magnets are affixed are thus representative of binary "1's." An advantageous information storage arrangement is thus achieved in which information, although permanently storable, is readily changed by simply removing the permanent magnet card containing one grouping of information and substituting for it a second card containing another information grouping. Such an information storage arrangement in which toroidal magnetic cores are employed as switching elements is described in detail in the copending application of the administratrix of the estate of S. M. Shackell, deceased, Serial No. 708,127, filed January 10, 1958.

Although in the illustrative permanent magnet storage arrangement referred to in the immediately foregoing, toroidal cores are advantageously employed as interrogating elements, magnetic wire memory elements also of a character well known in the art may be employed for this purpose with equal facility. By simply substituting a coordinate of toroidal core elements with a single wire memory element, particular address segments of the wire element may be disabled from flux switching during interrogation by adjacently disposed permanent magnets. Thus, the operation in terms of the manner of information storage and interrogation of such a wire memory element arrangement is closely similar to that of an analogous arrangement employing toroidal cores.

In such coordinate memory arrays where information is stored in the form of patterns of discrete magnetic fields operating upon magnetic switching elements, whether toroidal cores or memory wires, the problem is presented how most advantageously to bring an effective magnetic field into inductive relationship with a switching memory element. In one such wire memory element arrangement described in the copending application of the present inventor, Serial No. 858,636, filed December 10, 1959, a plurality of parallelly arranged magnetic wire memory elements constitute the Y coordinates of an XY coordinate array. The X coordinates of the array are made up of serially connected energizing windings which may conveniently be in the form of flat strip solenoids inductively coupled to the Y coordinate wire memory elements. The X coordinate solenoids are arranged in the memory array in conjunction with an electrically conductive sheet, which sheet comprises the information carrying portion of the memory array. Information is stored in the form of a predetermined pattern of apertures provided in the sheet, which apertures are arranged to coincide with information address segments of the wire memory elements at intersections or crosspoints of the X and Y coordinates of the array.

When an interrogating pulse is applied to a solenoid during readout, magnetic fields are generated as a result, which fields are operative in cooperation with the conductive sheet, to cause flux switching at the information address segments of the wire memory elements. The shielding effects of the conductive sheet at its solid portions as compared with the free operation of the fields at the apertures of the sheet on the ability of an information address segment to switch flux, provides the basis for discriminating between the two binary values. Thus, as is determined by the particular relationship of the conductive sheet to the other element of the memory array assembly, the particular binary value to be read out of an information address is controlled by the solid or apertured condition of the conductive sheet adjacent that information address. A simple and advantageous permanent memory array is thus achieved which does not require the use of permanent magnets to influence the switching behavior of the information address segments.

It is an object of the present invention to provide a new and novel means for controlling flux switching in address segments of magnetic wire memory arrays.

Another object of the present invention is to accomplish the patterned disabling of particular magnetic switching elements in a coordinate memory array in accordance with stored information without the use of permanent magnets.

It is another object of this invention to provide a new and novel means for permanently storing information bits in a coordinate memory array.

A further object of this invention is to simplify the construction of a permanent information storage array and at the same time to increase the reliability and performance of the readout circuitry.

The foregoing and other objects of this invention are realized in one specific illustrative embodiment thereof which comprises, like the coordinate memory array referred to previously herein, a plurality of parallelly arranged magnetic wire memory elements. The latter wire elements have helical magnetizable components which may be of substantially rectangular hysteresis characteristic material, and the wire elements constitute the Y coordinates of an XY coordinate array. The X coordinates of the array are made up of serially-connected energizing windings which may conveniently also be in the form of flat strip solenoids inductively coupled to the Y coordinate wire memory elements. The X coordinate solenoids, which define the information word groupings of the memory array, are arranged to face, on one side thereof, the wire memory elements. On the other side, the strip solenoids face flat information strips by means of which the immediate information storage function of this invention is performed. In a word-organized coordinate array arrangement presently contemplated, both the strip solenoids and corresponding information strips define the word rows. Individual information addresses are thus marked off on the intersecting magnetic wire memory elements by both the strip solenoids and corresponding information strips. At each of the information addresses so marked off the information strip is cut away in a manner corresponding to the particular binary information value to be stored at the address.

At an address where, say, a binary "1" is to be stored, the strip is cut away by having an aperture provided therein. This aperture is located substantially centrally of the information strip and, with respect to the associated wire memory element, such as to encompass the information address thereon. On the other hand, where a binary "0" is to be stored, the information strip is notched on opposite edges to provide a central solid portion of the information strip which is located with respect to the associated wire memory element such as also to encompass the information address thereon. A biasing current applied to the wire memory elements magnetically biases the magnetizable components of address segments thereof to one direction of magnetization. When an interrogating current pulse is applied to the strip solenoid of a selected word to be read, the fields generated as a result act to switch the magnetic flux of the coupled address segments of the memory elements to the opposite direction of magnetization. Any flux switching which occurs in the wire memory elements as a result of the applied interrogating pulse may advantageously be detected across the ends of the wire memory elements as voltage signals in the known manner of operation of such wire memory elements. The voltage signals so generated are also conventionally indicative of the storage in the interrogated information addresses of binary "1's."

In the present invention a direct current is continuously applied to the information strips and the magnetic fields generated thereby will be differently manifested at the apertured end notched points thereon. The fields generated at each of the information addresses will be proportional to the current density in the information strip at those points. Thus, at an information address where a binary "1" is to be read out, that is where the information strip is centrally apertured, the magnetic field acting on the address segment of the wire memory element is substantially negligible. The current in the information strip passes through the solid portions of the strip on either side of the aperture encompassing the information address with the result that the generated field at that point is divided and therefore incapable of effecting the flux switching ability of the associated address segment of the wire memory element. When an interrogating pulse is subsequently applied as above described, the interrogated information address is free to respond by flux switching to generate a voltage signal across the ends of the memory element indicative of a binary "1."

At an information address in which the information strip stores a binary "0," that is, where its edges are oppositely notched, the magnetic field acting on the address segment of the wire memory element is also proportional to the current density in the information strip at that point. However, at the latter address segment a solid portion of the strip appears and the generated field is concentrated at the address segment. As a result, the flux at the latter address segment is maintained in a magnetic flux state opposite to that of the continuously applied bias. Accordingly, when an interrogating current is applied to the associated word solenoid, no flux switching occurs in the interrogated address segment since the flux in that segment is already in the direction to which the interrogating magnetomotive force tends to drive it. A resulting absence of an appreciable voltage signal generated across the ends of the wire memory element is thus also conventionally indicative of the storage in an information strip of binary "0's." The information strips may advantageously be affixed to removable and interchangeable insulated information cards to achieve a simple permanent information storage array in which information is easily alterable. Additional economy and ease of fabrication may be achieved by utilizing the advantages of printed circuit techniques in preparing the information strips on the information cards.

In another illustrative embodiment of this invention, each of the information strips has superimposed thereon another strip which is also cut away in accordance with the stored information, but in a reciprocal fashion. Thus, where the lower strip has an aperture therein, the upper strip is oppositely notched and where the lower strip is notched the upper strip is apertured. The direct current applied to the information strips in this embodiment is oppositely poled for the upper and lower strips. At an address where a flux switching is to be permitted responsive to an interrogating current pulse, a field is generated by the information strips which here actually operates in the direction opposite to that of the applied interrogating drive. Flux switching indicative of the presence of a binary "1" in the information strips is thereby insured. On the other hand, at an address where a flux switching is to be inhibited when an interrogating drive is applied representative of the storage of a binary "0," the field provided by the superimposed information strips maintains the flux state of the interrogated information address segment of a wire memory element in the direction to which the interrogating drive tends to switch it. Advantageously in this embodiment the continuous magnetic bias applied to the address segments of the wire memory elements is not necessary since the superimposed information strips themselves control the particular magnetic state of the address segments. In this embodiment also the information strips may be fabricated in conjunction with a retaining card for ease of altering the information to be permanently stored.

It is a feature of this invention that conductive strips are positioned adjacent the information address segments of a magnetic wire memory array, the strips being apertured at the adresses at which binary "1's" are to be stored and oppositely notched at the addresses at which binary "0's" are to be stored. The different fields generated at notched and apertured portions of the information strips when the latter are energized thus control the switching of the address segments during interrogation of the memory array.

It is another feature of this invention that a first information strip, notched and apertured in accordance with information stored therein, has another information strip, reciprocally apertured and notched also in accordance with the same information, superimposed thereon. The fields generated by the two strips when energized control flux switching in the information address segments of a magnetic wire memory array during interrogation.

It is still a further feature of this invention that binary information, stored in the form of particular magnetic fields generated by energized information strips, notched and apertured in accordance with the information, is interrogated by means of magnetic wire memory elements.

The foregoing and other objects and features of this invention may be better understood from a consideration of the detailed description of specific illustrative embodiments thereof which follows when taken in conjunction with the accompanying drawing in which.

Figure 1:
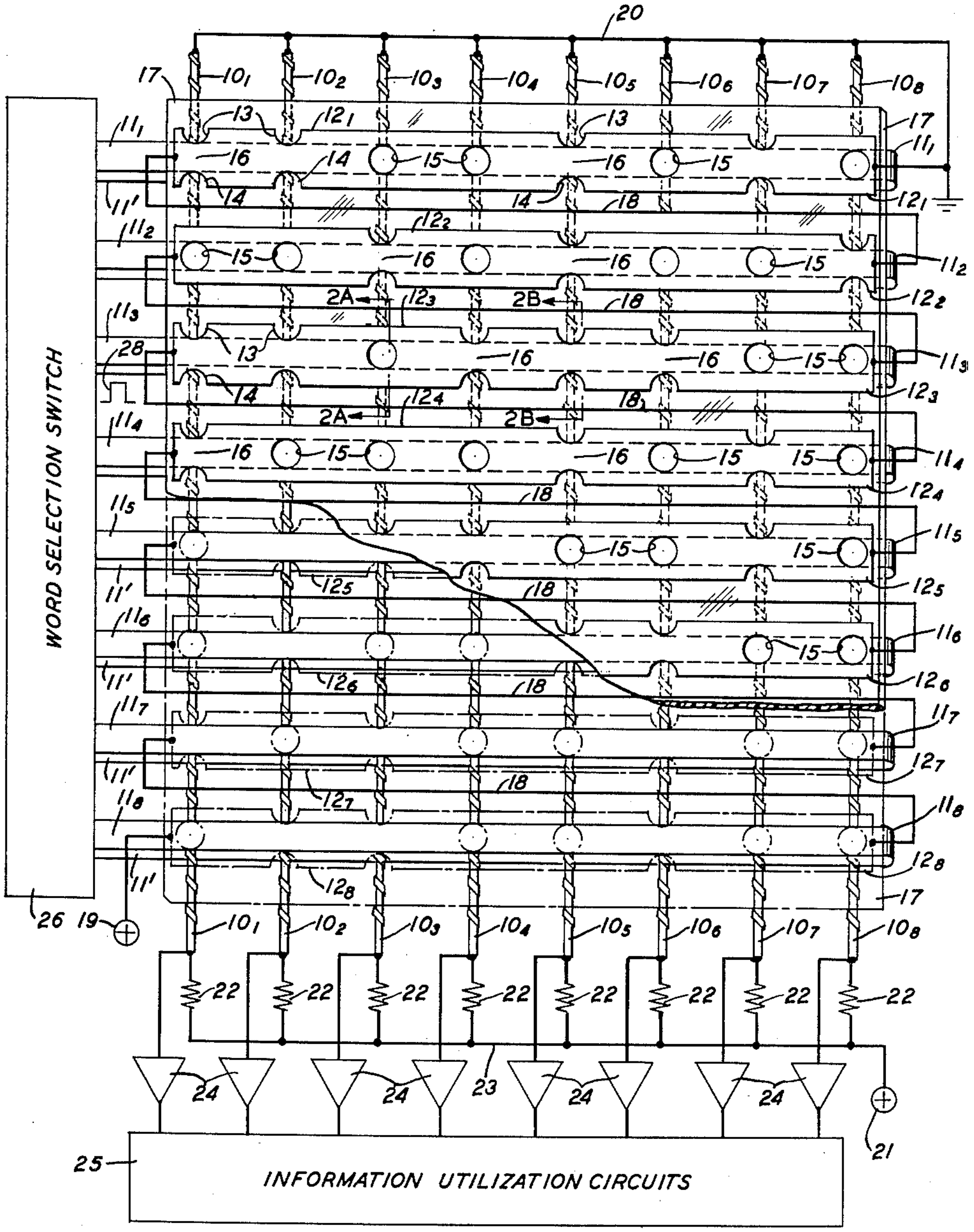
FIG. 1 is a simplified presentation of one illustrative memory array according to the principles of this invention with a portion thereof broken away better to show the details thereof.

The details of one specific illustrative embodiment of this invention may now be described with particular reference to FIG. 1 of the drawing. The memory array there presented comprises a plurality of magnetic wire memory elements $10_1$ through $10_8$. Each of the elements 10 comprises an electrical conductor having, in this embodiment, a helical magnetizable component wound therearound. Such a wire memory element is described in detail in another copending application of the present inventor, Serial No. 675,522, filed August 1, 1957. The helical magnetizable components may, but need not necessarily, have substantially rectangular hysteresis characteristics. Although the foregoing magnetic wire memory elements are assumed for purposes of describing the principles of this invention, it is to be understood that other magnetic wire memory elements operating on analogous flux switching principles may equally well be used in practicing this invention and such use is included within the scope thereof. The wire memory elements 10 are arranged substantially parallelly and form the Y coordinates of a coordinate array. Inductively coupled to the wire memory elements 10 and lying transversely thereto are a plurality of strip solenoids $11_1$ through $11_8$. The solenoids 11 are also arranged in parallel and comprise the X coordinates of the array. The solenoids 11 are so arranged with respect to the wire memory elements 10 that each passes above the latter elements as viewed in the drawing and each has a return 11′ passing beneath the memory elements 10 also as so viewed. An information address is defined at each of the coordinate intersections by the solenoids 11 on the wire memory elements 10, the information addresses taking the form of discrete segments of the wire elements 10.

Arranged above the plurality of strip solenoids 11 as viewed in the drawing is a plurality of information strips $12_1$ through $12_8$, respectively. The strips 12 are further positioned with respect to the wire memory elements 10 such that when energized in the manner to be described, an inductive coupling is achieved. The strips 12 are notched and apertured in accordance with the information which is to be stored in the memory array of which they are part. Thus, a pair of opposite notches 13 and 14 are provided at particular information addresses and an aperture 15 is provided at other information addresses. The notches 13 and 14 are each dimensioned so that a solid portion 16 substantially of a width equal to the length of an address segment of a wire memory element 10 is left in the strip 12. The apertures 15 are each dimensioned so as to encompass an address segment of a wire memory element 10. As will become apparent during the description of an illustrative operation of the memory array hereinafter, the notched portion 16 in an information strip 12 is representative of a binary "0" and the aperture 15 in an information strip 12 is representative of a binary "1." The information strips 12 may advantageously be affixed on a holding sheet to maintain the relative positions of the components so far described in alignment. In the embodiment of FIG. 1 the information strips 12 are shown as affixed to a translucent insulating sheet 17, which sheet together with the information strips $12_5$ through $12_8$ are depicted as partially broken away to show more clearly the details of the memory array assembly. The information strips 12 are serially connected together by conductors 18, the strip $12_8$ being connected at an input end to a source of positive direct current 19 and the strip $12_1$ being connected at an output end to ground. Each of the wire memory elements 10 is connected at one end to a ground bus 20 and its other end to a source of positive current 21 through a load resistor 22 via a conductor 23.

Each of the wire memory elements 10 is also connected at its other end through an amplifying means 24 to information utilization circuits 25. The solenoids 11 are connected at one end to a word selection switch 26 to which the returns 11′ are also connected. The sources 19 and 21 may comprise any suitable current generator capable of providing steady state currents of the character to be described herein. Similarly the amplifying means 24 are of a character as may be determined by the degree of amplification needed to raise output voltage signals generated by the memory array to levels suitable for use by the utilization circuits 25. The word selection switch 26 may advantageously comprise well-known magnetic core circuitry designed to selectively provide drive interrogation current pulses for the solenoids 11. Each of the circuit components 19, 21, 24, 25, and 26 will be known to and readily devisable by one skilled in the art and accordingly need only be shown symbolically without further detailed description. The memory array thus far described is organized as an 8 x 8 array; however, it is to be undersood that this invention is not limited to arrays of any particular capacity and arrays of any size are equally within the scope of this invention. The memory array of FIG. 1 is further described as word organized. Thus, each of the solenoid-information strip alignments defines a word row of the array.

With the foregoing organization and structural elements of a memory array according to this invention in mind, an illustrative operation thereof may now be described. This may conveniently be accomplished with reference to FIGS. 2A and 2B which show respectively, cross sections of the memory array of FIG. 1 at an information address in which a binary "1" is stored and one in which a binary "0" is stored. In describing an illustrative operation it will be assumed that the word row defined by the solenoid $11_3$ is selected for interrogation. The individual bits making up the information word stored at this row may be determined by inspection from the aperture and notch representations of the binary values as previously described as comprising the values, 0, 0, 1, 0, 0, 0, 1, 1. A continuously applied direct current postive bias is applied from the source 21 to each of the wire memory elements 10, which bias maintains a magnetic flux in the helical magnetizable components of the latter elements in a downward direction as viewed in the drawing and as indicated by the arrows 27 in FIGS. 2A and 2B. A continuous positive direct current is also applied from the source 19 to each of the serially connected information strips 12 which latter current acts to generate magnetic fields at the notched and apertured portions of the strips 12 as shown by the lines of force $f$ and $f'$ in FIGS. 2A and 2B, respectively. As described previously herein, the direct current from the source 19 is divided around an aperture 15 in an information strip 12 and accordingly two fields $f$ are generated at the solid portions of the strip 12 on either side of an aperture 15. These fields however are of relatively small magnitude and in any event are operative between the information address segments of the wire memory elements 10 and thus are unable to affect the read out operation of the array to be described. These fields $f$ are shown in FIG. 2A. At a solid portion 16 of the information strips 12, on the other hand, a larger field $f'$ is generated by the current applied from the source 21 and this field is strong enough to act on an address segment of a wire memory element 10. As may be determined from an inspection of FIG. 2B, the effect of the field $f'$ is to drive the address segment at a point adjacent thereto to a magnetic flux condition opposite to that of the magnetic bias resulting from the current applied from the source 21. The magnetic states of the information address segments of the wire memory elements 10 of the word row to be presently interrogated accordingly is as follows: the address segments on the memory elements $\mathbf{10}_1$, $\mathbf{10}_2$, $\mathbf{10}_4$, $\mathbf{10}_5$, and $\mathbf{10}_6$ are maintained magnetized upward against the bias of the source 21 by the direct current applied to the information strips 12 by the source 19, and the address segments on the memory elements $\mathbf{10}_3$, $\mathbf{10}_7$, and $\mathbf{10}_8$ are in their normal downward magnetization as the result of the bias from the source 21, uninfluenced by the continuously applied drive from the information strips 12. The magnetic directions indicated are for purposes of description as viewed in the drawing.

At the time that the selected word row is interrogated, a positive current pulse 28 is applied from the word selection switch 26 to the interrogating solenoid $\mathbf{11}_3$. As a result, magnetic fields are generated at each of the information addresses, which fields are designated by the lines of force $f''$ in FIGS. 2A and 2B. As is apparent from an inspection of the drawing, bearing in mind the polarity of the interrogating current pulse 28, the fields thus developed are in a upward direction as viewed in the drawing, that is, in a direction opposing that of the normal magnetic bias of the wire memory elements 10. Thus, as a result, at the information address segments of the latter elements which are uninfluenced by the information fields generated by the information strip $\mathbf{12}_3$, a flux switching occurs. A voltage signal of one polarity is accordingly generated across the ends of each of the wire memory elements $\mathbf{10}_3$, $\mathbf{10}_7$, and $\mathbf{10}_8$ at which the information strip $\mathbf{12}_3$ is oppositely notched. The voltage signals so generated are representative in the conventional manner of the storage in the information strip $\mathbf{12}_3$ at those addresses, of binary "1's" and are transmitted via the amplifying means 24, to the information utilization circuits 25. At the information adresses on the wire memory elements $\mathbf{10}_1$, $\mathbf{10}_2$, $\mathbf{10}_4$, $\mathbf{10}_5$, and $\mathbf{10}_6$, at which points the information strip $\mathbf{12}_3$ is apertured, the associated address segments are already in the magnetic direction to which the interrogating drive pulse tends to drive them. Accordingly, the latter address segments are merely driven further into magnetic saturation by the interrogating drive. Only negligible voltage signals, which may be considered as an effective absence of such signals, are generated across the ends of the wire memory elements 10 in question as a result. This absence of output signals is also detected at the utilization circuits 25 as representative of the storage in the information strip $\mathbf{12}_3$ at its apertures 15 of binary "0's."

At the termination of the interrogating pulse 28, the address segments of the wire elements 10 not maintained in the opposite direction of magnetization by the fields produced by the information strip $\mathbf{12}_3$ solid portions 16, are returned to the normal magnetic state by the bias supplied from the source 21. A voltage signal of the opposite polarity will be generated at this time also across the ends of the wire memory elements 10 in question. However, these latter signals may be discriminated by the amplifying means 24. Interrogation of other word rows defined by the remaining solenoids 11 is accomplished in a manner similar to that just described for the word row defined by the solenoid $\mathbf{11}_3$. In each case an interrogating current pulse is selectively applied by the word selection switch 26 to the solenoid 11 of the word row to be read. Voltage signals generated across the ends of the wire memory elements 10 in each case will be representative of the binary information values stored in the notched and apertured information strips 12. The wire memory elements 10 together with the energizing solenoids 11 thus effectively become interrogating means for the information stored in the information strips 12. In the foregoing illustrative read out operation a purely arbitrary sequence of information values was assumed to be stored in the information strip $\mathbf{12}_3$. Similarly, for illustrative purposes only, arbitrary groups of information values are shown as stored in the other information strips 12 in FIG. 1.

Figure 3:
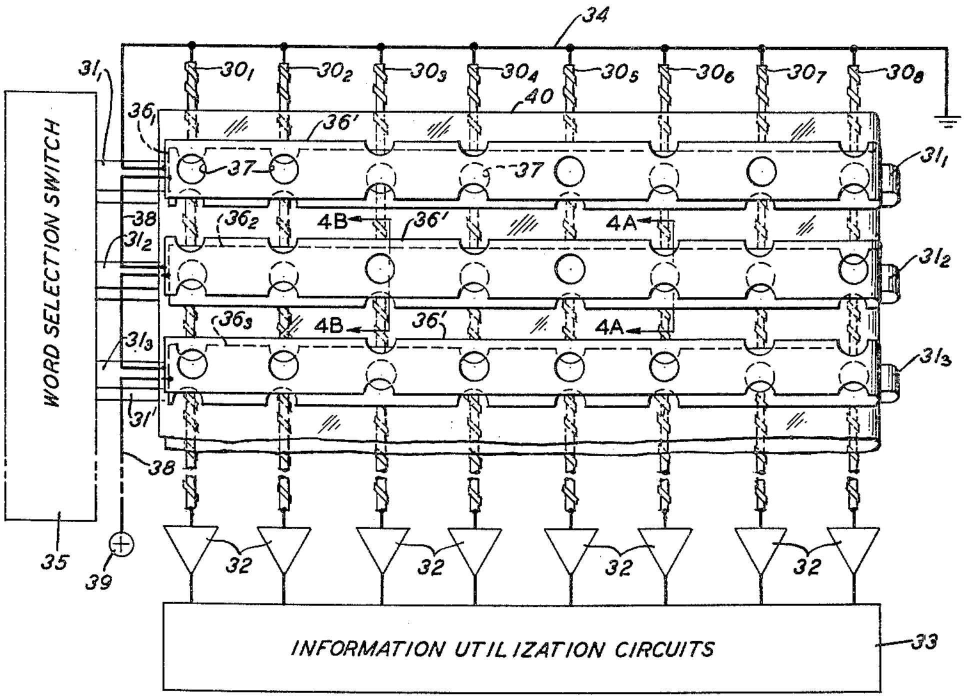
FIG. 3 is a simplified presentation of a portion of another illustrative memory array according to the principles of this invention showing its essential details.

Another illustrative embodiment of this invention is shown in part in FIG. 3. Only sufficient portions of the memory are there shown to gain a complete understanding of this embodiment of the invention. A plurality of magnetic wire memory elements $\mathbf{30}_1$ through $\mathbf{30}_8$, similar to those described in connection with the memory array of FIG. 1, are arranged in a coordinate array with a plurality of interrogating solenoids $\mathbf{31}_1$ through $\mathbf{31}_8$, only the solenoids $\mathbf{31}_1$, $\mathbf{31}_2$, and $\mathbf{31}_3$ of which are shown in FIG. 3. The solenoids 31 are inductively coupled to the memory elements 30 and define thereon a coordinate array of information addresses thereon in the maner also described for the embodiment of FIG. 1, each of the solenoids 31 having a return 31' passing beneath the elements 31 as viewed in the drawing. Each of the wire memory elements 30 is connected at one end through an amplifying means 32 to information utilization circuits 33 and at its other end to a ground bus 34. Each of the interrogating solenoids 31 is connected at one end, and at its other end through its return 31', to a word selection switch 35. The latter switch and the amplifying means 32 may be of a character identical to that described for the corresponding elements of the embodiment of FIG. 1. It may be noted at this point that no magnetic biasing means is provided in the present embodiment nor, as will become clear hereinafter, is such a means required.

Arranged in alignment with the interrogating solenoids 31 and thereabove as viewed in the drawing, is a plurality of doubled information strips 36. The lower portion of each of the strips, only the strips $\mathbf{36}_1$, $\mathbf{36}_2$, and $\mathbf{36}_3$, of which are shown, is analogous in its information bearing character to the information strips 12 of the embodiment of FIG. 1. At an information address where a binary "0" is to be stored an aperture 37 is provided in the lower portion of the strip 36 and at an information address where a binary "1" is to be stored the strip is oppositely notched. The upper portion 36' of each of the information strips 36, on the other hand, is reciprocally cut away to provide an aperture at an information address where the lower portion of the strip is notched and to provide a pair of opposite notches where the lower portion is apertured. The strips 36 may advantageously be affixed to an insulated sheet by means of well known printed circuit techniques also in a manner similar to that referred to in connection with the embodiment of FIG. 1. In the embodiment of FIG. 3 the strips 36 are depicted as being affixed to a translucent insulated sheet 40 which is also doubled over to align the notches and apertures and the apertures and notches of the opposing portions of the information strips 36. The strips 36 are also serially connected in a direct current energizing circuit 38, which circuit is connected at one end to the ground bus 34 and at the other end to a source of positive direct current 39. The latter current is continuously applied during the operation of the memory array of FIG. 3 in opposite directions in the two portions of the information strips 36. This follows from the serial connection of the latter strips in the circuit 38 with the current entering a strip 36 at its lower portion in one direction and returning by way of the upper portion 36' in the opposite direction.

Figure 2A:
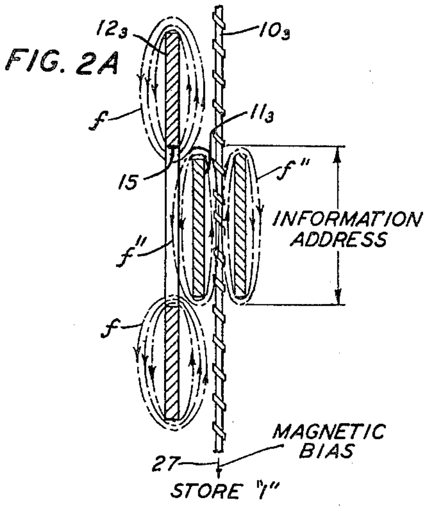
FIGS. 2A and 2B are cross-sectional views of particular portions of the memory array of FIG. 1 taken along the lines 2A and 2B, respectively.
Figure 2B:
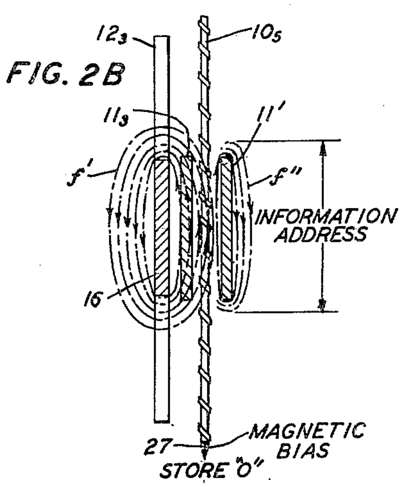

The memory array of FIG. 3 is operated in a manner similar to that described for the embodiment of FIG. 1 with the exception, as was mentioned previously herein, that no continuous magnetic bias is necessary in connection with establishing a normal flux state in the address segments of the wire memory elements 30. An information word is read out by applying an interrogating current pulse from the word selection switch to one of the interrogating solenoids 31. The binary values read out are manifested by any flux switching, or absence of flux switching, that occurs in the interrogated address segments of the wire memory elements 30 as these flux switchings generate voltage signals across the ends of the latter wire elements. The signals so generated are then also transmitted via the amplifying means 32 to the information utilization circuits 33. The information representative fields generated by the information strips 36 operate in a manner similar to that described for the information strips 12 of FIG. 1, but achieve a more advantageous flux switching control. The fields generated at the reciprocally notched and apertured portions of the information strip 36 and their effect on flux switching in the address segments of the wire memory elements 30 may be understood with reference to the cross-sectional views of FIGS. 4A and 4B.

Figure 4A:
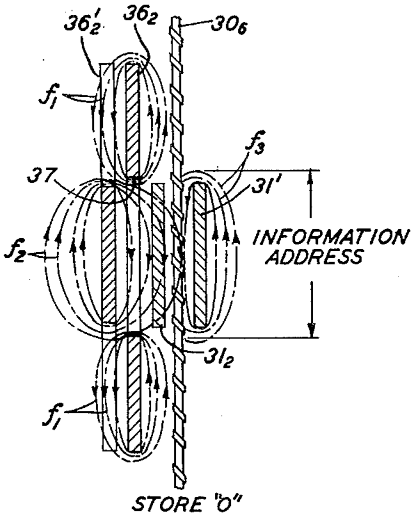
FIGS. 4A and 4B are cross-sectional views of particular portions of the memory array of FIG. 3 taken along the lines 4A and 4B, respectively.

FIG. 4A shows a cross section of the memory array of FIG. 3 at an address where a binary "0" is stored and is taken along the lines 4A of that figure. The continuously applied positive direct current from the source 39 generates magnetic fields represented in FIG. 4A by the lines of force $f_1$ and $f_2$. In the lower portion of the information strip $36_2$ the current is caused to divide around the aperture 37 thus causing the two fields $f_1$. Whatever effect the latter fields may have on the memory element $30_6$ is immaterial since this effect is not within an address segment of the element $30_6$. In the upper portion $36_2'$ of the information strip $36_2$ the latter strip is notched at the information address in question. Accordingly, a single field is generated opposite in polarity to that of the fields $f_1$. This field, represented in FIG. 4A by the lines of force $f_2$, is sufficiently large to maintain the associated address segment of the wire memory element $30_6$ in a downward magnetic direction as viewed in the drawing. When a positive interrogating current pulse is applied from the word selection switch 35 to the interrogating solenoid $31_2$ during a readout phase of operation, a flux switching field is developed around the latter solenoid at each of the information addresses. This switching field, represented in FIG. 4A only on the return 31' of the solenoid $31_2$ by the lines of force $f_3$ is in a direction in which the address segment is already driven by the field $f_2$ of the information strip portion $36_2'$. As a result of the applied interrogating drive, the address segment being interrogated is merely driven further into saturation with the further result that only a negligible voltage signal is generated across the ends of the memory element $30_6$. This effective absence of a signal condition on the latter element is transmitted via an amplifying means 32 to the information utilization circuit 33 as conventionally indicative that a binary "0" is stored in the information strip $36_2$ at the address being interrogated. At the termination of the interrogating current pulse an unappreciable flux excursion takes place in the address segment being read as the flux of the latter segment returns to the control of the field being continuously generated by the information strip $36_2$. The negligible voltage signal of the opposite polarity generated across the wire memory element $30_6$ may be easily discriminated by the amplifying means 32 and the utilization circuits 33.

Figure 4B:
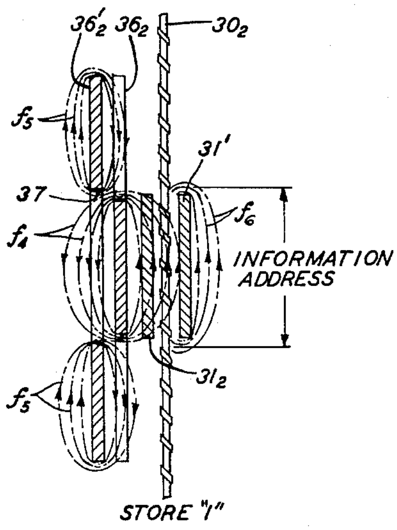

FIG. 4B shows a cross section of the memory array of FIG. 3 at an address where a binary "1" is stored and is taken along the lines 4B of that figure. The continuously applied positive current from the source 39 generates magnetic fields represented in FIG. 4B by the lines of force $f_4$ and $f_5$. In the lower portion of the information strip $36_2$ the current is here caused to follow the central solid portion thus causing a single field $f_4$. The latter field is operative at the associated information address segment to induce a magnetic flux therein which is maintained in preparation for a subsequent opposing readout field applied by the interrogating solenoid $31_2$. Fields $f_5$ are generated by the upper portion 36' of the information strip $36_2$ and specifically by the current dividing around the aperture 37 in the solid portions thereof. The fields $f_5$ will be of insufficient magnitude to induce a flux in the wire memory element $30_2$ and, in any event, its effect is operative only at portions of the element $30_2$ not comprising an information address segment. During a subsequent readout phase of operation a positive current pulse applied to the interrogating solenoid $31_2$ generates magnetic fields at each information address as represented by the lines of force $f_6$ shown only in connection with the return 31' of the solenoid $31_2$. The interrogating fields $f_6$ are in opposition to the field $f_4$ maintaining a magnetic flux in the information address segment and are of sufficient magnitude to cause a flux switching in the latter segment. A resulting voltage signal generated across the ends of the wire memory element $30_2$ is transmitted via an amplifying means 32 to the information utilization circuits 33. This voltage signal is conventionally indicative of a binary "1" stored in the information strip $36_2$ at the interrogated information address. At the termination of the interrogating current pulse the continuously applied field $f_4$ returns the interrogated information address segment to its magnetic information representative condition. As a result, another voltage signal of opposite polarity is generated across the ends of the wire memory element $30_2$. The latter signal may also be discriminated by the amplifying means 32 and the information utilization circuits 33. Interrogation of each of the remaining information addresses of the memory array of FIG. 3 is accomplished in a manner similar to that described for the information addresses lying on the section lines 4A and 4B. The sequence of binary information values in each of the word rows of the memory array of FIG. 3, although similar to that of the word rows depicted in the embodiment of FIG. 1, is also arbitrarily selected for purposes of description only.

In each of the embodiments shown in the figures of the drawing the component parts have been represented out of scale and their relationship exaggerated also for purposes of illustration to gain a complete understanding of the organization of this invention and the manner of its practice. Further, what have been described are considered to be only illustrative embodiments of the principles of this invention and it is to be understood that various and numerous other arrangements may be devised by one skilled in the art without departing from the spirit and scope of this invention.

What is claimed is:

1. A memory circuit comprising a plurality of magnetic wire memory elements, an energizing winding means coupled to each of said wire memory elements and defining a plurality of information address segments thereon, means including a pulse source for applying an energizing current pulse to said winding means for causing a flux switching at each of said address segments of said memory elements, a conductive information strip means inductively coupled to each of said information segments of said wire memory elements, said strip being oppositely notched at particular ones of said information address segments representative of one information value and said strip being apertured at others of said information address segments representative of another information value, means for applying a current to said information strip to generate magnetic fields at the notched portions of said strip to prevent said flux switching at said particular ones of said information addresses, and means for detecting flux switching in the wire memory elements having said others of said information address segments thereon.

2. A memory circuit as claimed in claim 1 also comprising means for magnetically biasing each of said plurality of wire memory elements in a direction opposite to the direction of said flux switching at said information address segments.

3. A memory circuit comprising a plurality of wire memory elements each having a magnetizable component associated therewith, an interrogating winding means inductively coupled to said plurality of wire memory elements and defining a plurality of information address segments thereon, means including a pulse source for applying an energizing current pulse to said winding means for causing a flux switching at each of said address segments of said memory elements, means for differently controlling said flux switching at said information address segments comprising an information strip means associated with said winding means, said strip means being oppositely notched at particular ones of said information address segments and said strip means being apertured at others of said information address segments, and means for applying a continuous current to said information strip means; and means for detecting voltage signals generated across the ends of each of said wire memory elements.

4. An information storage circuit comprising a first and second wire memory element, an energizing winding means inductively coupled to each of said first and said second memory elements and defining a first and a second information address segment thereon, respectively, means for magnetically biasing said first and said second memory element in one direction, means for applying an interrogation current pulse to said winding means for generating magnetic fields operative at said first and said second information address segments in the opposite direction, an information strip means inductively coupled to said first and said second information address segments, means for applying a current to said information strip means for generating magnetic fields operative in said opposite direction, said information strip means being cut away at portions thereof such that said last-mentioned fields are operative on said first wire memory element within the length of said first information address segment representative of a first information value and operative on said second wire memory element outside the length of said second information address segment representative of a second information value.

5. An information storage circuit as claimed in claim 4 in which said information strip means is cut away to a portion substantially narrower than the remainder of said strip means at said first information address segment and said information strip means is divided to form two portions thereof passing to either side of said second information address segment.

6. An information storage circuit as claimed in claim 4 also comprising means for detecting voltage changes across the ends of said first and said second wire memory elements.

7. An information storage circuit comprising a conductive information strip means, said strip means being notched at a first information address thereon to form a substantially narrower portion than the remainder of said strip means and having an aperture therein at a second information address thereon dividing said strip means into two branching portions, means for applying a current to said strip means for generating a first magnetic field at said first information address representative of one binary information value and for generating a pair of second magnetic fields at said second information address representative of the other binary information value; and readout means for sensing said binary information values comprising a first and a second magnetic wire memory element, said first element having an information address segment thereof within said first magnetic field and said second element having an information address segment thereof between said pair of second magnetic fields, an energizing winding means inductively coupled to said information address segments of said first and said second wire memory elements, means for applying an interrogating current pulse to said winding means for generating magnetic fields operating on said first and said second information address segments, and means for detecting flux changes in said first and said second magnetic wire memory elements.

8. An information storage circuit comprising a first conductive information strip means, said first strip means being notched at a first information address thereon to form a substantially narrower portion than the remainder of said first strip means and having an aperture therein at a second information address thereon dividing said first strip means into two branching portions, a second conductive information strip means superimposed on said first strip means, said second strip means being notched at said second information address on said first strip means to form a substantially narrower portion than the remainder of said second strip means and having an aperture therein at said first information address of said first strip means dividing said second strip means into two branching portions, means for applying a current of one polarity to said first strip means and of the opposite polarity to said second strip means for generating a first magnetic field in one direction at said first information address representative of one binary information value and for generating a second magnetic field in the opposite direction at said second information address representative of the other binary information value; and readout means for sensing said binary information values comprising a first and a second magnetic wire memory element, said first element having an information address segment thereof within said first magnetic field and said second element having an information address segment thereof within said second magnetic field, an energizing winding means inductively coupled to said information address segments of said first and said second wire memory elements, means for applying an interrogating current pulse to said winding means for generating magnetic fields operating on said first and said second information address segments, and means for detecting flux changes in said first and said second magnetic wire memory elements.

9. A memory circuit comprising a plurality of magnetic wire memory elements, an energizing winding means coupled to each of said wire memory elements and defining a plurality of information address segments thereon, means including a pulse source for applying an energizing current pulse to said winding means for causing a flux switching at each of said address segments of said memory elements, a first conductive information strip means inductively coupled to each of said information segments of said wire memory elements, said first strip means being oppositely notched at particular ones of said information address segments representative of one information value and said first strip means being apertured at others of said information address segments representative of another information value, a second conductive information strip means superimposed on said first strip means, said second strip means being oppositely notched at said others of said information address segments and said second strip means being apertured at said particular ones of said information address segments, means for applying a current of one polarity to said information strip means and of the opposite polarity to said second information strip means to generate magnetic fields in a direction opposite to that of said flux switching at said particular ones of said information address segments and in the direction of said flux switching at said others of said information address segments, and means for detecting flux switching in said wire memory elements.

10. A memory circuit comprising a first and a second magnetic wire memory element, a first conductive information strip means inductively coupled to said first and said second wire memory elements, and defining a first and a second information address segment thereon, respectively, a second conductive information strip means superimposed on said first strip means, means for applying a current in one direction to said first strip means and in the opposite direction to said second strip means to generate magnetic information fields, said first information strip means being oppositely notched at said first address segment and apertured at said second address segment and said second information strip means being apertured at said first address segment and oppositely notched at said second address segment to induce a magnetic flux in one direction in said first address segment and induce a magnetic flux in the opposite direction in said second address segment, an interrogating winding means inductively coupled to said first and said second address segments, means for applying an interrogating current pulse to said winding means to induce a switching flux in said one direction in said first and said second address segments, and means for detecting flux switching in said first and said second wire memory elements.

11. A memory circuit as claimed in claim 10 in which said first and said second information strip means comprise folded portions of a single strip and said interrogating winding means comprises a flat strip solenoid.

12. A memory circuit comprising a first and a second magnetic wire memory element, a conductive information strip inductively coupled to said first and said second magnetic wire memory elements and defining a first and a second information address segment thereon, respectively, means for applying a current to said information strip to generate magnetic information fields, said information strip being oppositely notched at said first address segment and apertured at said second address segment to induce a magnetic flux in one direction within said first address segment, an interrogating winding means inductively coupled to said first and said second address segments, means for applying an interrogating current pulse to said winding means to induce a switching flux in said one direction in said first and said second address segments, and means for detecting flux switching in said first and said second wire memory elements.

13. A memory circuit as claimed in claim 12 also comprising means for inducing a biasing flux in said first and said second wire memory elements at said address segments in a direction opposite to that of said switching flux.

14. A memory circuit comprising a magnetic wire memory element, a first conductive information strip inductively coupled to said memory element and defining a first information address segment thereon, a second conductive information strip inductively coupled to said memory element and defining a second information address segment thereon, means for applying a current to said first and second information strips to generate magnetic information fields, said first strip being oppositely notched at said first address segment to induce a magnetic flux in one direction within said first address segment, said second strip being apertured at said second address segment to divide said information fields from said second address segment, a first and a second interrogating winding means inductively coupled to said first and said second address segments, respectively, means for selectively applying an interrogating current pulse to said first winding means to induce a switching magnetic field in said one direction at said first address segment, and means for detecting flux switching and the absence of flux switching in said magnetic wire memory element.

15. A memory circuit as claimed in claim 14 also comprising means for also selectively applying another interrogating pulse to said second winding means to induce a switching flux in said one direction in said second address segment.

16. A memory circuit as claimed in claim 15 also comprising means for inducing a magnetic bias in said wire memory element at said first and said second address segments in a direction opposite to said one direction.

17. A memory circuit comprising a magnetic wire memory element, a first pair of conductive information strips inductively coupled to said memory element and defining a first information address segment thereon, a second pair of conductive information strips inductively coupled to said memory element and defining a second information address segment thereon, corresponding first strips of said first and said second pairs of strips having opposing notches in the edges thereof and an aperture therein at said first and said second information address segments, respectively, corresponding second strips of said first and said second pairs of strips having apertures therein and opposing notches in the edges thereof at said first and said second information address segments, respectively, means for applying a current to said corresponding first strips in one direction and a current to said corresponding second strips in the opposite direction to induce a magnetic flux in one direction in said first address segment and to induce a magnetic flux in the opposite direction in said second address segment, a first and a second interrogating winding means inductively coupled to said first and said second address segments, respectively, means for selectively applying interrogating current pulses to said first and said second winding means to induce switching fluxes in said one direction in said first and said second information address segments, respectively, and means for detecting flux switching and the absence of flux switching in said magnetic wire memory element.

18. An information storage circuit comprising a plurality of magnetic wire memory elements, a conductive information strip means inductively coupled to said wire memory elements and defining information addresses thereon, means for applying a current to said strip means, said strip means being oppositely notched at said information addresses to store one information value and being apertured at said information addresses to store another information value, an interrogating winding means also inductively coupled to said wire memory elements at said information addresses, means for applying an interrogating current pulse to said winding means, and means for detecting flux switching in said plurality of wire memory elements.

19. A magnetic memory array comprising a plurality of magnetic wire memory elements, a plurality of conductive information strips inductively coupled to said plurality of wire memory elements and defining a coordinate array of information address segments thereon, said strips being oppositely notched at said information address segments to store one binary information value and being apertured at said information address segments to store the other binary information value, means for applying a current to each of said plurality of information strips in the same direction, a plurality of interrogating winding means inductively coupled to said plurality of wire memory elements at said address segments corresponding to said information strips, respectively, means for selectively applying interrogating current pulses to said plurality of winding means, and means for detecting voltage signals generated across the ends of said wire memory elements.

20. A magnetic memory array as claimed in claim 19 also comprising means for inducing a magnetic bias in each of said wire memory elements.

21. A magnetic memory array comprising a plurality of magnetic wire memory elements, a first plurality of conductive information strips inductively coupled to said plurality of wire memory elements and defining a coordinate array of information address segments thereon, a second plurality of conductive information strips inductively coupled to said plurality of wire memory elements at said information address segments, said first strips being oppositely notched and said second strips being apertured at information address segments where one binary value is stored and said first strips being apertured and said second strips being oppositely notched at information segments where the other binary value is stored, means for applying a current to each of said first strips in one direction and to each of said second strips in the opposite direction, a plurality of interrogating winding means inductively coupled to said plurality of wire memory elements at said address segments corresponding to said information strips, respectively, means for selectively applying interrogating current pulses to said plurality of winding means, and means for detecting voltage signals generated across the ends of said wire memory elements.

22. A magnetic memory array comprising a plurality of magnetic wire memory elements, a plurality of first conductive information strips inductively coupled to said plurality of wire memory elements and defining a coordinate array of information address segments thereon, said strips being oppositely notched at information address segments where one binary information value is stored and being apertured at information address segments where the other binary information value is stored, means for applying a direct current to each of said plurality of information strips in the same direction to generate magnetic fields for inducing a magnetic flux in one direction in the information address segments in which said one binary information value is stored, a plurality of interrogating winding means inductively coupled to said plurality of wire memory elements at said address segments corresponding to said information strips, respectively, means for selectively applying an interrogating current pulse to a particular one of said winding means for inducing a switching flux in the associated address segments in said one direction, and means for detecting voltage signals generated across the ends of said wire memory elements.

23. A magnetic memory array as claimed in claim 22 also comprising means for inducing a magnetic bias in each of said memory elements in said one direction.

24. A magnetic memory array as claimed in claim 22 in which each of said plurality of interrogating winding means comprises a flat strip solenoid.

25. A magnetic memory array as claimed in claim 22 in which each of said plurality of conductive information strips is carried on a removable insulating sheet.

26. A magnetic memory array as claimed in claim 22 also comprising a plurality of second conductive information strips inductively coupled to said plurality of wire memory elements and superimposed on said plurality of first information strips, respectively, said plurality of second information strips being apertured at information address segments where said one binary information value is stored and oppositely notched at information address segments where said other binary information value is stored, said plurality of second information strips being connected respectively to said plurality of first information strips such that said direct current is applied to each of said second information strips in the direction opposite to that in which said direct current is applied to said first strips to generate magnetic fields for inducing a magnetic flux in the opposite direction in the information address segments in which said other binary information value is stored.

References Cited in the file of this patent

UNITED STATES PATENTS

| | | |
|---|---|---|
| 2,740,110 | Trimble | Mar. 27, 1956 |
| 2,769,873 | Noregaard | Nov. 6, 1956 |
| 2,931,023 | Quade | Mar. 29, 1960 |

FOREIGN PATENTS

| | | |
|---|---|---|
| 1,105,870 | France | July 13, 1955 |

OTHER REFERENCES

"Nondestructive Sensing," etc., D. A. Buck et al., Communications and Electronics, pp. 822–830, January 1954.